United States Patent
Rajala et al.

(10) Patent No.: US 9,820,223 B2
(45) Date of Patent: Nov. 14, 2017

(54) METHOD AND SYSTEM FOR MANAGING A LOCATION DETECTOR

(71) Applicant: Numerex Corp., Atlanta, GA (US)

(72) Inventors: Yoganand Rajala, Alpharetta, GA (US); Francis Eugene Rohling, Kennesaw, GA (US)

(73) Assignee: Numerex Corp., Atlanta, GA (US)

( * ) Notice: Subject to any disclaimer, the term of this patent is extended or adjusted under 35 U.S.C. 154(b) by 139 days.

(21) Appl. No.: 14/559,190

(22) Filed: Dec. 3, 2014

(65) Prior Publication Data

US 2016/0165569 A1    Jun. 9, 2016

(51) Int. Cl.
| | |
|---|---|
| H04W 52/02 | (2009.01) |
| H04B 1/3827 | (2015.01) |
| H04W 24/10 | (2009.01) |
| H04W 4/02 | (2009.01) |
| G01S 19/14 | (2010.01) |
| G01S 19/34 | (2010.01) |
| H04W 64/00 | (2009.01) |

(52) U.S. Cl.
CPC ......... *H04W 52/0209* (2013.01); *G01S 19/14* (2013.01); *G01S 19/34* (2013.01); *H04B 1/385* (2013.01); *H04W 4/02* (2013.01); *H04W 24/10* (2013.01); *H04B 2001/3861* (2013.01); *H04W 64/00* (2013.01); *Y02B 60/50* (2013.01)

(58) Field of Classification Search
CPC ....... H04W 4/02; H04W 4/021; H04W 4/022; H04W 4/025; H04W 4/028; H04W 4/04; H04W 64/00; H04W 36/0061; H04W 36/0083; H04W 36/20; H04W 36/245; H04W 36/24; H04W 36/30

USPC .......... 455/456.1, 456.2, 456.3, 456.5, 456.6
See application file for complete search history.

(56) References Cited

U.S. PATENT DOCUMENTS

| | | | | |
|---|---|---|---|---|
| 2003/0148765 A1* | 8/2003 | Ma | ......................... | H04W 36/32 455/438 |
| 2007/0066334 A1* | 3/2007 | Butts | ..................... | H04W 64/00 455/522 |
| 2007/0270148 A1* | 11/2007 | Yeh | ........................ | H04W 36/30 455/436 |
| 2008/0018458 A1* | 1/2008 | Derrick | ................ | G07C 9/00111 340/539.13 |
| 2010/0113061 A1* | 5/2010 | Holcman | ................. | G01S 19/34 455/456.1 |
| 2011/0263268 A1* | 10/2011 | Shcherbatyuk | ......... | G01C 21/26 455/456.1 |
| 2012/0264436 A1* | 10/2012 | Fujito | .................... | H04W 36/08 455/438 |

* cited by examiner

*Primary Examiner* — Anthony Addy
*Assistant Examiner* — Martin Chang
(74) *Attorney, Agent, or Firm* — King & Spalding LLP

(57) ABSTRACT

A portable device, for example an offender monitor, can utilize a location detector, such as a GPS receiver, to provide locational information for the device. The portable device can communicate over a cellular network, for example transmitting location readings over the network. The device can maintain the location detector in a state of reduced energy consumption and activate the receiver when conditions of the cellular environment indicate a high probability of the device moving a noteworthy distance. In various examples, the decision can take into consideration change in signal strength and/or history of cell tower utilization.

12 Claims, 6 Drawing Sheets

| Cell Tower History Table ||||| 
|---|---|---|---|---|
| Time | SID | NID | BSID | AvgRSSI |
| 09:25:41 | a2 | b2 | c2 | Avg_r2(t) |
| 09:24:41 | a1 | b1 | c1 | Avg_r1(t) |
| (empty) | | | | |
| (empty) | | | | |

FIG. 4

METHOD AND SYSTEM FOR MANAGING A LOCATION DETECTOR

TECHNICAL FIELD

The present technology relates generally to offender monitors and more particularly to activating a location detector, such as a global positioning system (GPS) receiver, to take a location reading when wireless signal strength or other information suggests a substantial amount of change in an offender's location.

BACKGROUND

A variety of devices incorporate GPS receivers and other location detectors for determining location. Many such devices have power constraints, and a receiver or detector, when activated, consumes a substantial portion of the device's power budget. For example, for battery-operated devices, operating a location detector can substantially shorten battery life, resulting in inconveniently frequent recharges or loss of service when battery energy is exhausted. The issue for wearable devices, such as offender locators, is particularly acute since the battery is typically small.

Accordingly, there are needs in the art for managing a location detector. For example, need exists for managing a GPS receiver to manage electrical power consumption. A technology addressing such a need, or some related deficiency in the art, would result in benefits that may include better portability, extended life, fewer recharges, or higher reliability, for example.

SUMMARY

A portable device can comprise a location detector that provides locational information about the device. The portable device can communicate over a cellular network. The device can maintain the location detector in a state of reduced energy consumption and activate the detector when conditions of the cellular environment indicate a high probability of the device moving a noteworthy distance.

The foregoing discussion of managing a location detector is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIG. 4 is a record for an offender monitor in accordance with some example embodiments of the present technology.

Figure 1:
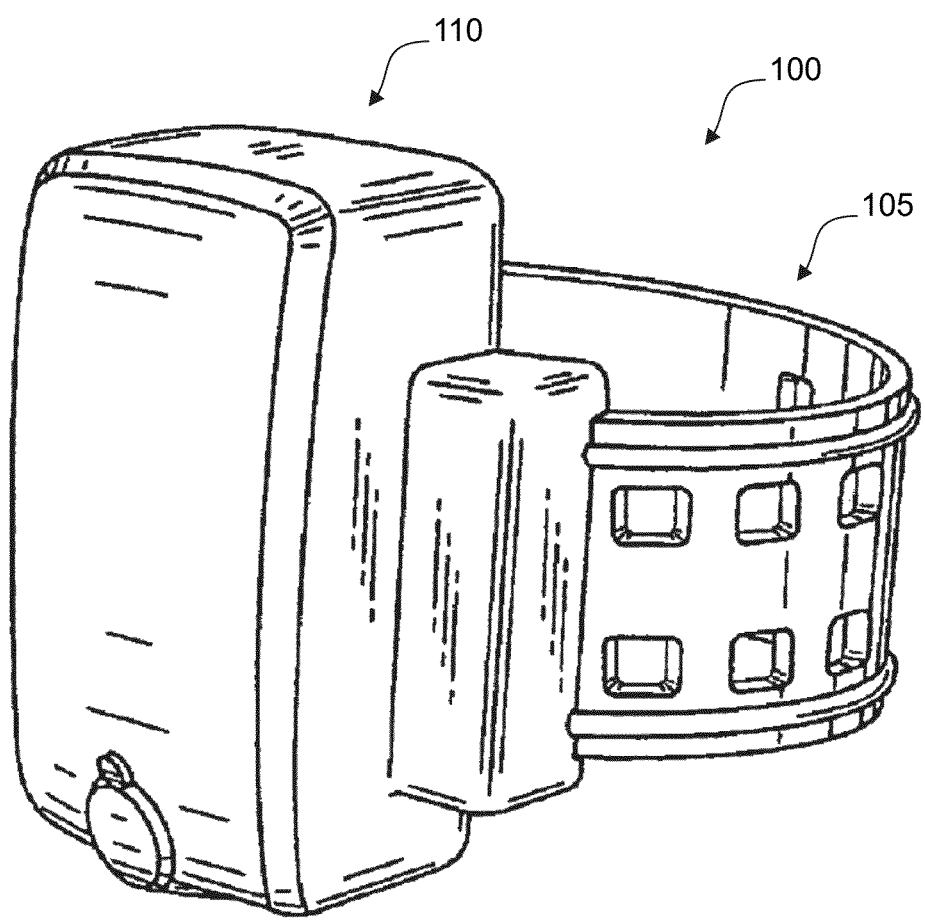
FIG. 1 is an illustration of an offender monitor in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A battery-operated device, for example a Machine-to-Machine (M2M) device, may utilize continuous wireless coverage to accept immediate commands from a server. Such a device may comprise a high-accuracy location detector, for example a GPS receiver. Continuous acquisition of position from such sensors typically entails consuming non-trivial amounts of energy from the device's power subsystem. However, as discussed in further detail below, the energy consumption can be managed via significantly reducing the rate of location acquisition on the location detector according to sensed changes in a wireless environment. For example, a substantial change in the wireless environment can trigger an asynchronous GPS reading. The GPS reading can be acquired at a relatively low synchronous acquisition rate to meet reporting time constraints or objectives. In some embodiments, positional sensing is limited by a high synchronous acquisition rate to reduce battery drain. Accordingly, positional fixes can be implemented on a limited or controlled basis, when conditions indicated that the device has a high probability of moving. Reducing the number of location sensor acquisitions thus helps manage overall power consumption of the device. In some example embodiments discussed below, a controller activates the location detector utilizing a temporal history of the wireless environment in a manner that can be resilient to rapid switches between one cell tower and another.

In some example embodiments, a battery powered electronic device provides continuous electronic monitoring and reporting of the location of an inanimate asset or person. An on-board controller can extend battery life of an M2M device that relies upon continuous wireless connectivity to respond promptly to inputs from automation servers.

In some example embodiments, the device's controller comprises a firmware solution that operates in conjunction with a commercial, off-the-shelf wireless modem that comprises or utilizes a radio. The firmware may function as an application on a processor integrated with the modem or on a separate low power microcontroller.

In some example embodiments, the controller distinguishes between cell tower changes that are associated with a substantial change in the device's location and cell tower changes that are associated with something other than a substantial change in the device's location. A cell tower change that is due to a substantial change in device location may warrant taking a GPS reading. However, the reading may not be warranted if the cell tower change is due to load management of a cellular network or small movements when the device is near the boundary between two cells. In a modern cellular environment, a cellular device may switch between two or three cell towers while the device is in a fixed position, and the controller may identify such switches and avoid taking an unnecessary reading when the occur.

In some example embodiments, the controller may utilize a temporal history of cell towers to reduce false movement changes as the device rapidly switches between towers.

In some example embodiments, the controller ages a temporal history of towers over time to support retriggering as the device re-enters an area where the device was previously located.

Some example embodiments comprise a tracking device that may be attached to a person or object to provide timely and accurate position fixes. The position fixes can be aggregated, recorded, processed, and/or sent to one or more end user systems. The tracking device may have other sensors and outputs unrelated to the tracking function as useful for various applications. In some embodiments, the tracking device can comprise an offender monitor. In some embodiments, management of a GPS receiver is implemented utilizing firmware embedded on the tracking device. GPS receiver management can extend battery life of a new or existing tracking device hardware platform without hardware modifications, for example. Accordingly, tracking devices can better serve applications where recharging or replacing batteries is inconvenient or difficult.

In a typical tracking device, a wireless data modem and a GPS receiver account for a substantial portion of power consumption. Reducing the level of average energy consumption supports a smaller device footprint, as the battery (or super-capacitors) are usually the larger, heavier, and more expensive elements of the tracking device. (The term "battery," as used herein, is intended to be broad enough to cover one or more super-capacitors. That is, a super-capacitor is considered herein to constitute one example embodiment of a battery.)

In some example embodiments, the tracking device processes input signals normally acquired from the device's on-board wireless modem to create a trigger for acquiring an accurate position fix, for example via activating the GPS receiver. The tracking device can institute position fixes at a relatively low periodic rate until the device moves a noteworthy distance. Detection of such movement or detecting a change in the RF environment can trigger a fix or a series of fixes at a higher periodic rate. Throttling or otherwise reducing the position fixes when the device is not moving can help conserve battery energy. In other words, the trigger can reduce the frequency of GPS position fixes so that the tracking device operates longer on the same fixed battery energy. Accordingly, timely location fixes from a GPS receiver that occur in response to detection of the movement can be useful for M2M tracking applications.

Modern cellular networks can handoff a cellular device from one cell tower to another tower or another channel within the same tower routinely, for example in connection with network load management. In some example embodiments, the tracking device historically trends cell towers to determine whether a handoff is due to a substantial change in device location. The tracking device can aggregate cell tower identification and signal strength information into a time-ordered history. Each tower channel can be characterized by a unique cellular ID (e.g. SID/NID/BID for CDMA or MCC, MNC, LAC, CELL_ID for GSM) and its average signal strength as received by the tracking device. If a new tower channel is detected or a significant change in received signal strength occurs, then the tracking device can activate its GPS receiver and obtain an accurate fix. In some example embodiments, the result is a solution where periodic GPS sampling can be reduced to once every 15 to 60 minutes, while the system obtains an accurate fix with a latency of 1 to 3 minutes from the time of movement.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates an example offender monitor 100 according to some embodiments of the present technology. The illustrated offender monitor 100 provides a representative, non-limiting example, of a tracking device.

The illustrated offender monitor 100 comprises a strap 105 that extends around an appendage of an offender who is being monitored, for example around the offender's leg or arm. The strap 105 is attached to a housing 110 that encloses electrically powered elements as discussed below. The offender may be a criminal on parole or a person under a government order for monitoring, for example. In example embodiments, the illustrated offender monitor 100 can be characterized as a tracking device for monitoring the movement of an individual.

In some example embodiments, the housing 110 can enclose various components such as one or more batteries, electronic circuitry (e.g., a transceiver, GPS locating circuitry, antenna, etc.), optical devices (e.g., a light source, a light receiver, etc.) and optical connectors. Padding can optionally be provided on the back of the housing 110 to facilitate wearing the offender monitor 100 comfortably around a leg or an arm of an individual, for example. In some embodiments, such padding is omitted. The individual can be, for example, an offender who is subject to a restraining order or house arrest from a court or other authority. One end of the strap 105 attaches to the housing 110. In installation, the other end of the strap 105 is wrapped around the individual's leg or arm and fixed to the housing 110, for example using pins or other fasteners.

In some example embodiments, the offender monitor can be worn as two separate elements. For example, a body-worn element can provide short-range monitoring/communication, while a body-attached element can comprise a cellular radio and a GPS modem.

U.S. Pat. No. 8,115,621, issued Feb. 14, 2012 in the name of Yoganand Rajala and Steve Aninye and entitled "Device for Tracking the Movement of Individuals or Objects" discloses some example embodiments of an offender monitor 100 and is hereby incorporated herein by reference.

Figure 2:
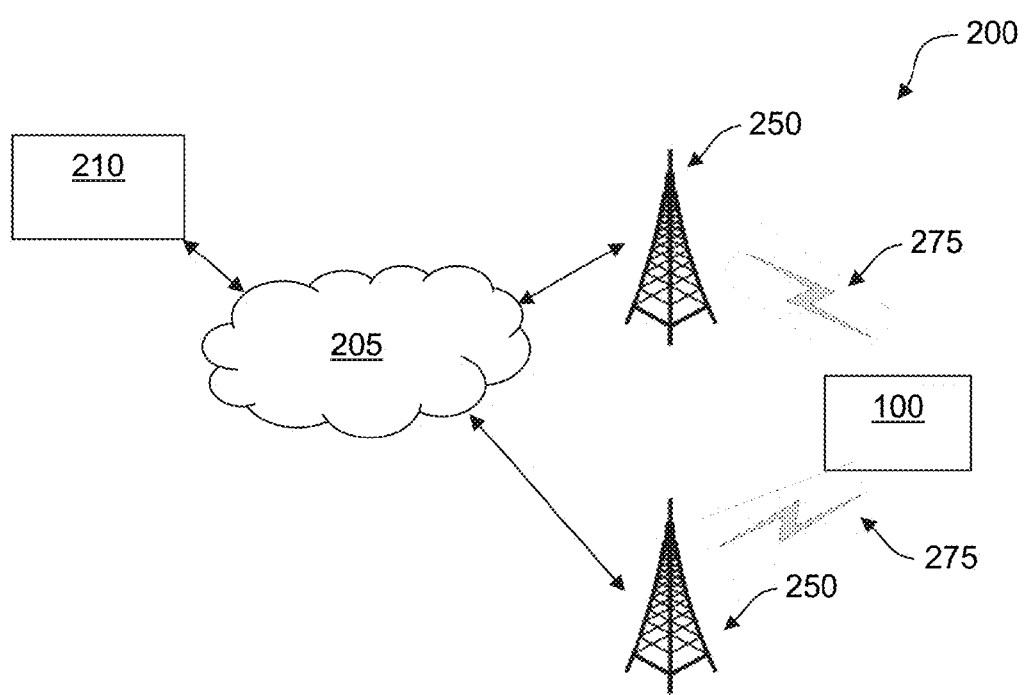
FIG. 2 is an illustration of an operating environment for an offender monitor in accordance with some example embodiments of the present technology.

Turning now to FIG. 2, this figure illustrates an example operating environment for the offender monitor 100 according to some embodiments of the present technology. In the illustrated embodiment, the operating environment comprises a cellular system 200. As illustrated, the offender monitor 100 is located near two cell towers 250 and may communicate with either via respective communication channels 275. The cell towers 250 communicate with a server 210 over a network 205. The server 210 provides location services for the offender monitor 100 as well as for other monitors (not illustrated) that may be attached to other people or objects.

Figure 3:
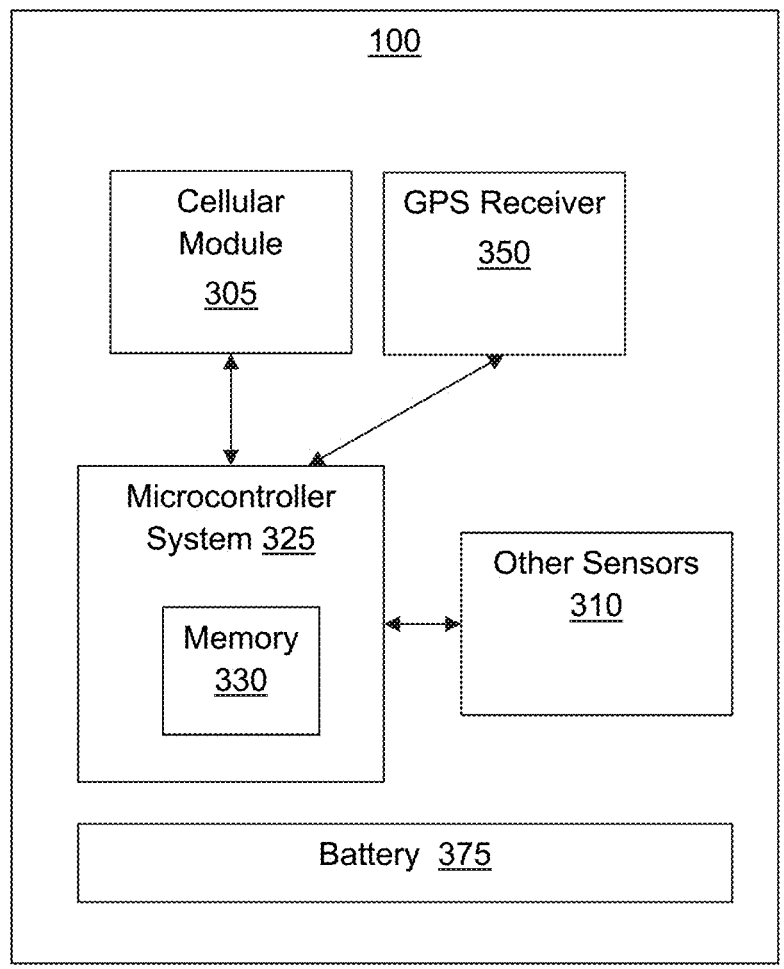
FIG. 3 is a functional block diagram of an offender monitor in accordance with some example embodiments of the present technology.

Turning now to FIG. 3, this figure illustrates a functional block diagram for the example offender monitor 100 according to some embodiments of the present technology. In the illustrated embodiment, the offender monitor 100 comprises a cellular module 305, a GPS receiver 350, a microcontroller system 325, and other sensors 310, all of which are powered by an on-board battery 375. The cellular module 305 comprises an example embodiment of a radio. In various example embodiments, the cellular module can comprise CDMA/GSM/UMTS/HSPA or LTE technology. In some embodiments, a GPS receiver is embedded in the cellular module 305. The other sensors 310 may include tamper detectors, orientation sensors, switches, microphones, gyroscopes, accelerometers, etc.

The GPS receiver 350 comprises an example embodiment of a location detector. In some embodiments, a location detector within the offender monitor 100 employs cell-tower-based triangulation, such as advanced forward link trilateration (AFLT), or employs a signal-strength-based location approach, such as received signal strength indicator (RSSI) based on tower or Wifi signals. The offender monitor 100 can utilize such technologies as embodiments of a location detector to augment or support, or as a substitution for, satellite-based location tracking. Further, GPS tracking can utilize assisted GPS (A-GPS) to improve location acquisition speed.

In some example embodiments, the cellular module 305 and the GPS receiver 350 are integrated into a single modem module or chip or chip set. In operation, the cellular module 305 maintains a connection to the one or more cell towers 250 over one or more wireless channels 275 over a wireless network as illustrated in FIG. 2. In an example embodiment, the cellular module 305 continuously attempts to keep a cellular connection available to the tower 250. In such an embodiment, the server 210 can control the operation of the offender monitor 100 by sending commands or other data to the monitor 100 at any time.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. The memory 330 can comprise persistent memory that stores program code. Accordingly, the memory 330 can comprise firmware for executing management and control functions, including for embodiments of the processes illustrated in FIGS. 5 and 6 in flowchart form.

In operation, the microcontroller system 325 acquires the cell tower information from the cellular module 305 across a data interface. The microcontroller system 325 can track cell tower history, for example as a table as illustrated in FIG. 4. When triggered by the microcontroller system 235, a GPS acquisition occurs on the GPS receiver 350. Alternately, a cell tower history table and/or GPS control functions can be integrated into the cellular module 305 or other appropriate device. In some embodiments, the application runs inside the cellular module 305.

In some embodiments, a cell tower history program runs on a separate low power microcontroller and communicates with a separate wireless modem across a serial interface and a separate GPS receiver across a second wireless interface.

Referring now to FIG. 4, this figure illustrates an example record for the offender monitor 100 according to some embodiments of the present technology. More specifically, in the embodiment illustrated in FIG. 3, the microcontroller system 325 maintains a Cell Tower History Table 400 as illustrated in FIG. 4 in example form.

At initialization, the microcontroller system 325 and associated firmware clear the Cell Tower History Table 400 of data. The microcontroller system 325 requests cell tower identification and signal strength information from the cellular module 305 at a rapid rate, for example once per minute. This data populates current cell tower history data in the first row 425 of the Cell Tower History Table 400. The time, SID, NID, and BSID for the cell tower 250 respectively populate the indicated columns 401, 405, 410, and 415. As further discussed below with reference to example equation 1, a moving weighted average of signal strength is recorded in the upper cell of column 420. At this time, the other rows 430, 435, 440 remain empty. When a new cell tower 250 is detected, the data in the first row 425 moves to the second row 430, and the data for the new cell tower 250 populates the vacated first row 425. In this manner, the Cell Tower History Table 400 maintains a cell tower record that is indexed according to most recent activity.

If the wireless modem detects a new cell tower 250, for example a CDMA base station, then a high accuracy locating acquisition is indicated. A "New Tower Channel Added" event is passed to rate-limiting logic, which may trigger the GPS acquisition unless an acquisition was recently acquired within a minimum acquisition period configuration parameter.

The microcontroller system 325 integrates (averages) the received RSSI for each cell tower channel, for example using the following moving weighted average equation:

$$\text{Avg\_RSSI}(t) = \tfrac{1}{8} * \text{RSSI}(t) + \tfrac{7}{8} * \text{Avg\_RSSI}(t-1) \qquad \text{Equation 1}$$

Tower data can be captured periodically at a configured interval of time, for example once per 60 seconds. When the change in integrated (averaged) RSSI signal for a given tower channel exceeds a predefined threshold, for example 9 dB, then an "RSSI Change" event is triggered. This event is passed to a rate limiting computation that may trigger another GPS acquisition. The new RSSI is used as a starting point when the change is triggered.

As long as no new cell tower is detected and the RSSI remains stable, the GPS acquisition period increases to the maximum acquisition period, thereby saving energy since no movement is indicated. This effectively acquires GPS data synchronously at a relatively low data rate, for example in a range of approximately 10 to 30 minutes.

When the offender monitor 100 is moved, it may encounter a new cell tower 250, for example a CDMA base station. This new cell tower 250 is added to the Cell Tower History Table 400 as illustrated in FIG. 4. The older base station is pushed down the list. Because a new base station is detected, a "New Tower Channel Added" event passes to the rate-limiting logic, ensuring a timely high accuracy GPS acquisition. In some embodiments, entries that have aged to a level within an aging window are removed.

When the offender monitor 100 is moved, it may encounter no wireless base station. In this case, "New Tower Channel Added" event passes to the rate-limiting logic. However, the Cell Tower History Table 400 is not updated, since the radio frequency (RF) environment changed. Since movement detection is constrained by the change in the RF environment, the GPS acquisition period decreases to the higher GPS acquisition rate. With the offender monitor 100 disposed outside base station coverage, energy consumption increases.

When a cell tower 250 passes the offender monitor 100 off to another cell tower 250 due to base station bandwidth or received signal strength, the offender monitor 100 will detect a change and generate a "New Tower Channel Added" event possibly causing a GPS acquisition. This may happen without physical movement of the offender monitor 100. Because the offender monitor 100 does not know whether the cell tower change is due to physical movement, the offender monitor 100 activates the GPS receiver 350 to ensure a fix within the movement detection window.

Consider a use case where the offender monitor 100 was operating on "Cellular Channel 1" and switched to "Cellular Channel 2." If the cell tower 250 switches back to "Cellular Channel 1," then a trigger is generated if the RSSI level from the previous connection to "Cellular Channel 1" is outside the RSSI threshold setting. If the offender monitor 100 did not move, then the RSSI is expected to be nearly the same as it was a few minutes or even a couple of hours earlier. In this use case, no GPS acquisition is triggered because of the cell tower switch, thereby saving the energy of a GPS acquisition. However, the Cell Tower History Table 400 entries switch so that "Cell Channel 1" is back as the first entry (i.e. in row 425) since it is the most recent communication.

The Cell Tower History Table 400 is implemented with a finite number of entries for unique base station information, for example 10 entries. Since the Cell Tower History Table 400 is maintained in time sequence order, and since new entries are added at the top of the list, entries can be pushed off the end of the list. This scenario may occur if the offender monitor 100 is moving in a vehicle that is traveling on a long road journey, for example. The offender monitor 100 will continue to encounter new cell towers 250, and old entries will roll off the Cell Tower History Table 400 as a matter of course. Should the journey terminate, and the offender monitor 100 moves back down the road toward its original origin, new triggers will continue to be generated either because the cell entries were not in the Cell Tower History Table 400 or because the RSSI values are changing rapidly. This is useful behavior as it will cause "breadcrumbs" of positional information to be recorded along the journey at near the fastest synchronous GPS acquisition rate. These breadcrumbs can be traced to determine an offender's journey, for example.

After a period of time, nominally, four to five hours, data regarding a specific cell tower channel may be completely removed from the Cell Tower History Table 400. This "aging" process helps ensure that seeing a new tower 250 causes a trigger when it has not been seen for a long period of time.

Example processes for managing GPS acquisition will now be described in further detail with reference to FIGS. 5 and 6. Example reference will be made to the preceding figures, without limitation. In some example embodiments, instructions for execution of the relevant parts of the processes 500 and 600 that FIGS. 5 and 6 illustrate in flowchart form can be stored in the memory 330 and executed by the microcontroller system 325, for example.

Figure 5:
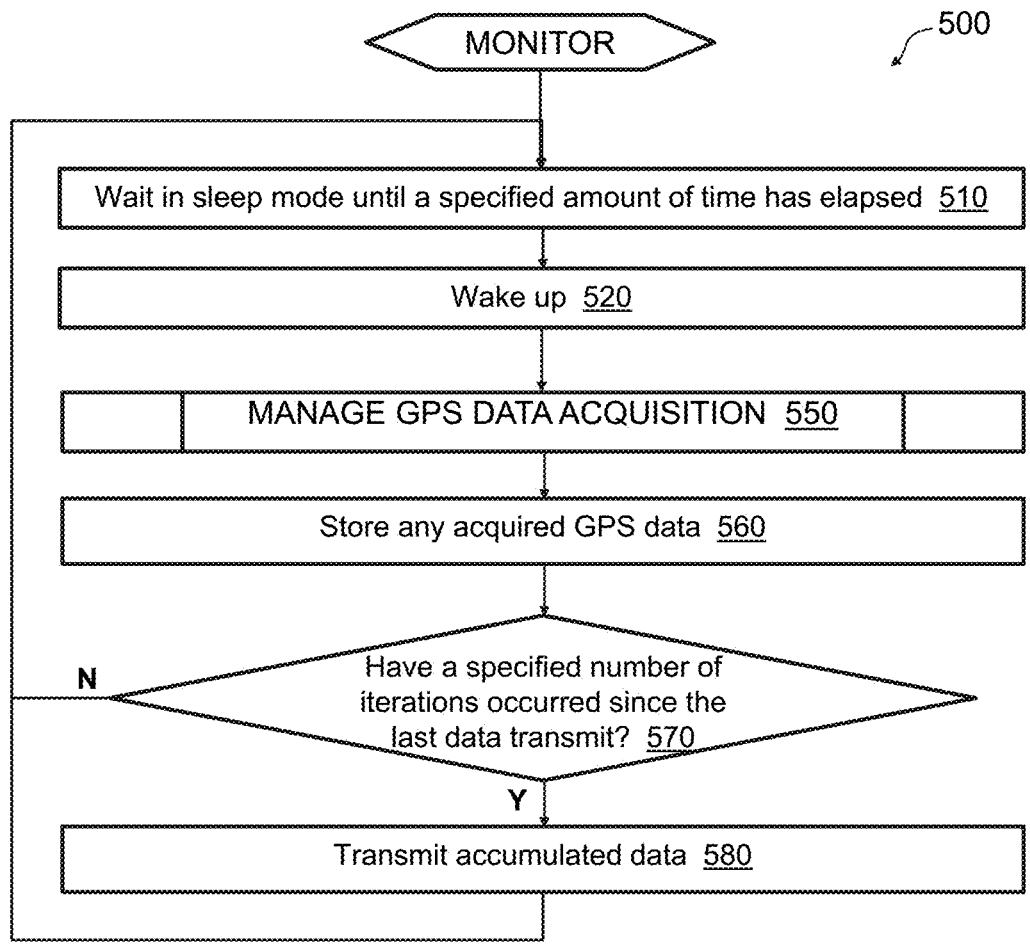
FIG. 5 is a flowchart of a process for monitoring offender location with an offender monitor in accordance with some example embodiments of the present technology.
Figure 6:
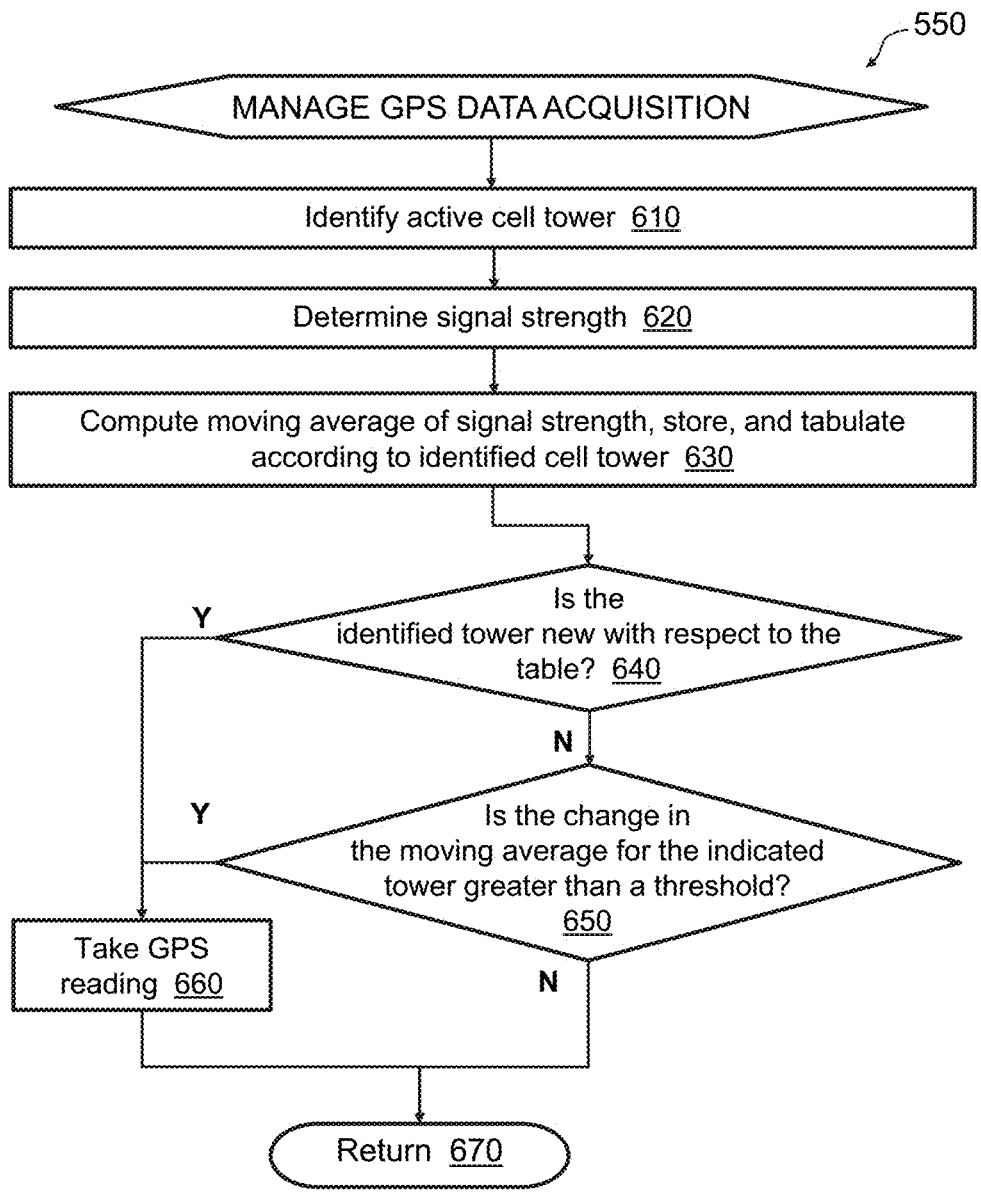
FIG. 6 is a flowchart of a process for managing a GPS receiver in connection with offender monitoring in accordance with some example embodiments of the present technology.

Turning now to FIG. 5, this figure illustrates a flowchart of an example process 500 for monitoring offender location with the offender monitor 100 according to some embodiments of the present technology.

At block 510 of process 500, the microcontroller system 325 waits in sleep mode until a specified amount of time has passed. The time may be one minute, as an example without limitation.

At block 520, the microcontroller system 325 wakes up, as the specified time has elapsed.

At block 550, the microcontroller system 325 manages data acquisition and makes decisions about activating the GPS receiver 350 to acquire a GPS reading. A flowchart for an example embodiment of block 550, in the form of a routine or sub-process, is illustrated in FIG. 6 and will be discussed below.

At block 560, any GPS data acquired during execution of block 550 is stored.

At inquiry block 570, the microcontroller system 325 determines whether a specified number of iterations of blocks 510, 520, 550, and 560 have occurred since the last data transmit. If the determination is negative, then process 500 loops back to block 510 and iterates. In some embodiments, the inquiry of block 570 is based on a timer rather than a number of iterations. In such an embodiment, block 570 may have a dedicated timer for evaluating whether a threshold amount of time has elapsed to transmit a batch of data at block 580.

If the determination is positive, then process 500 executes block 580. If the specified number is ten, then approximately ten minutes will have elapsed in the example of a one-minute wait at block 510.

At block 580, the microcontroller system 330 transmits the accumulated GPS data, for example as a batch, to the server 210 via the cellular module 305. Following the transmission, process 500 loops back to block 510 and iterates.

Turning now to FIG. 6, this figure illustrates a flowchart of the example process 550 for managing a GPS receiver 350 in connection with offender monitoring according to some embodiments of the present technology. As discussed above, process 550 as illustrated in FIG. 6 represents an example embodiment of block 550 of process 500 that FIG. 5 illustrates.

At block 610, the microcontroller system 325 identifies the cell tower 250 with which the cellular module 305 is communicating and notes SID, NID, BSID, and the current time.

At block 620, the microcontroller system 325 determines signal strength. The signal strength can be for wireless signals received by the cellular module 305 over the wireless channel 275, for example.

At block 630, the microcontroller system 325 computes a moving weighted average of the signal strength, for example according to equation 1 as discussed above. The time, SID, NID, BSID, and computation result are stored in the appropriate cells of the Cell Tower History Table 400, according to row 425, 430, 435, 440 and column 401, 405, 410, 415, 420.

At decision block 640, the microcontroller system 325 determines whether the identified cell tower 250 was already represented on the Cell Tower History Table 400, i.e. immediately before the recordation at block 630.

If the decision at block 640 is positive, then process 550 branches to block 660, and the GPS receiver 350 is activated. The receiver 350 takes a reading, i.e. a fix.

If the decision at block 640 is negative, then decision block 650 executes. At decision block 650, the microcontroller system 325 compares the moving weighted average computation for the indicated cell tower 250 to the last moving weighted average computation for that same cell tower 250. Thus, if an intervening communication session occurred with a different cell tower 250, signal strength for that intervening session would typically be ignored with respect to the current decision. In other words, the example moving weighted average computation is tower-specific. If the moving weighted average has changed by a threshold amount between the current and the prior computational iteration, then block 660 executes to acquire a GPS reading, as the change in signal strength is indicative of a noteworthy level of movement.

Following execution of block 660, block 670 returns execution to process 500, and process 500 continues as illustrated in FIG. 5 and discussed above.

If, on the other hand, the change in the moving weighted average is below the threshold, then block 670 executes without taking the GPS reading and process 500 proceeds.

Technology for managing a GPS receiver has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. An offender monitor comprising:
   a battery;
   a location detector;
   a radio;
   a connection to the radio; and
   memory; and
   processor executable instructions stored in the memory to perform the steps of:
      during a first iteration of a time interval, determining a first RF signal strength;
      during a second iteration of the time interval, determining a second RF signal strength; and
      during a third iteration of the time interval, determining a third RF signal strength;
      determining whether to take a location reading with the location detector based on a moving weighted average that utilizes the first RF signal strength and the second RF signal strength and that ignores the third RF signal strength,
         wherein determining whether to take the location reading comprises:
            taking the location reading if a change in the moving weighted average is greater than a threshold; and
            not taking the location reading if the change in the moving weighted average is lower than the threshold,
         wherein the first RF signal strength is for a first communication session between the offender monitor and a first cell tower, wherein the second RF signal strength is for a second communication session between the offender monitor and the first cell tower, and wherein the third RF signal strength is for a third communication session between the offender monitor and a second cell tower that is intervening between the first communication session and the second communication session,
         wherein the first communication session comprises the first iteration of the time interval, the second communication session comprises the second iteration of the time interval, and the third communication session comprises the third iteration of the time interval,
         wherein the offender monitor communicates over a channel of the first cell tower during the first communication session, with the first communication session terminating when the first cell tower passes the offender monitor to the second cell tower,
         wherein the offender monitor communicates over a channel of the second cell tower during the third communication session, with the third communication session terminating when the second cell tower passes the offender monitor to the first cell tower, and
      wherein the offender monitor communicates over a channel of the first cell tower during the second communication session.

2. The offender monitor of claim 1, wherein the processor executable instructions stored in the memory are further to perform the steps of:
   maintaining a list of cell towers with which the offender monitor has communicated; and
   in response to the offender monitor communicating with a cell tower that is not on the list,
      adding the cell tower to the list, and
      activating the location detector.

3. The offender monitor of claim 1, wherein the location detector comprises a GPS receiver or a network assisted location receiver,
   and wherein the processor executable instructions stored in the memory are further to perform the steps of:
      iteratively determining, on the time interval, whether to activate the GPS receiver and take a GPS reading;
      storing a batch of the GPS readings taken over a predefined number of iterations of the time interval; and
      transmitting the batch for receipt at a server.

4. A method for managing a location detector for an offender monitor, comprising:
   during a first iteration of a time interval, determining a first signal strength;
   during a second iteration of the time interval, determining a second signal strength;
   during a third iteration of the time interval, determining a third signal strength;
   determining whether to take a location reading with the location detector based on a moving weighted average that utilizes the first signal strength and the second signal strength and that ignores the third signal strength, wherein determining whether to take the location reading comprises:
      taking the location reading if a change in the moving weighted average is greater than a threshold, the moving weighted average comprising the first signal strength and the second signal strength; and not taking the location reading if the change in the moving weighted average is lower than the threshold, wherein the first signal strength is for a first communication session between the offender monitor and a first cell tower, wherein the second signal strength is for a second communication session between the offender monitor and the first cell tower, wherein the third signal strength is for a third communication session between the offender monitor and a second cell tower that is intervening between the first communication session and the second communication session, wherein the first communication session comprises the first iteration of the time interval, the second communication session comprises the second iteration of the time interval, and the third communication session comprises the third iteration of the time interval, wherein the offender monitor communicates over a channel of the first cell tower during the first communication session, with the first communication session terminating when a cellular network passes the offender monitor from the first cell tower to the second cell tower, wherein the offender monitor communicates over a channel of the second cell tower during the third communication session, with the third communication session terminating when the cellular network passes the offender monitor from the second cell tower to the first cell tower, and wherein the offender monitor communicates over a channel of the first cell tower during the second communication session.

5. The method of claim 4, wherein the determination is based on the moving weighted average computed using the first and second signal strengths, and wherein other communication sessions between the offender monitor and other cell towers are intervening between the first communication session and the second communication session.

6. The method of claim 4, wherein the offender monitor comprises a GPS receiver, and wherein the method comprises the steps of:
cyclically determining whether to activate the GPS receiver based on a change in moving weighted average of signal strength; and
in response to completing a predefined number of cycles of determining whether to active the GPS receiver, transmitting a batch of GPS readings taken during the predefined number of cycles.

7. The method of claim 4, wherein the offender monitor comprises a GPS receiver, and wherein the method further comprises the steps of:
maintaining a list of cell towers with which the offender monitor has communicated; and
in response to the offender monitor communicating with an unlisted cell tower, activating the GPS receiver.

8. The method of claim 4, wherein the offender monitor comprises a GPS receiver, and wherein the method further comprises the steps of:
maintaining a record of cell towers with which the offender monitor has communicated, the record indexing the cell towers according to most recent communication; and in response to the offender monitor communicating with a cell tower that is not represented in the record, dropping from the record the lowest indexed cell tower, adding the cell tower to the record, and activating the GPS receiver.

9. An offender monitor comprising:
a strap sized for attaching to an offender;
a housing attached to the strap;
a battery disposed in the housing;
a location detector disposed in the housing; a radio disposed in the housing;
a processor that is disposed in the housing, that is powered by the battery, and that comprises:
a connection to the location detector; a connection to the radio; and
a memory; and
a program that distinguishes between cell tower changes associated with a substantial change in location of the offender monitor which warrant taking a location reading and cell tower changes due to load management of a cellular network which do not warrant taking the location reading, that is stored in the memory, and that comprises processor executable instructions for implementing steps comprising:
during a first iteration of a time interval, determining a first signal strength;
during a second iteration of the time interval, determining a second signal strength;
during a third iteration of the time interval, determining a third signal strength;
determining whether to take a location reading with the location detector based on a moving weighted average that utilizes the first signal strength and the second signal strength and that ignores the third signal strength,
wherein determining whether to take the location reading comprises:
taking a GPS reading if a change in the moving weighted average is greater than a threshold; and
not taking the GPS reading if the change in the moving weighted average is lower than the threshold,
wherein the first signal strength is for a first communication session between the offender monitor and a first cell tower,
wherein the second signal strength is for a second communication session between the offender monitor and the first cell tower,
wherein the third signal strength is for a third communication session between the offender monitor and a second cell tower that is intervening between the first and second communication sessions,
wherein the first communication session comprises the first iteration of the time interval, the second communication session comprises the second iteration of the time interval, and the third communication session comprises the third iteration of the time interval,
wherein the offender monitor communicates over a channel of the first cell tower during the first communication session, with the first communication session terminating when the cellular network passes the offender monitor from the first cell tower to the second cell tower, wherein the offender monitor communicates over a channel of the second cell tower during the third communication session, with the third communication session terminating when the cellular network passes the offender monitor from the second cell tower to the first cell tower, and wherein the offender monitor communicates over a channel of the first cell tower during the second communication session.

10. The offender monitor of claim 9, wherein the determination is based on the moving weighted average computed using the first and second signal strengths, and wherein the first and second signal strengths represent intensity of RF signals.

11. The offender monitor of claim 9, wherein the program that is stored in the memory further comprises processor executable instructions for implementing steps comprising:

maintaining a record of cell towers with which the offender monitor has communicated, the record indexing the cell towers according to most recent communication; and in response to the offender monitor communicating with a cell tower that is not represented in the record, dropping from the record the lowest indexed cell tower, adding the cell tower to the record, causing the location detector to take a location reading.

12. The offender monitor of claim 9, wherein determining whether to take a location reading based on a first signal strength and a second signal strength comprises extending life of the battery.

* * * * *